INVENTOR
PAUL E. MARTIN
ATTORNEYS

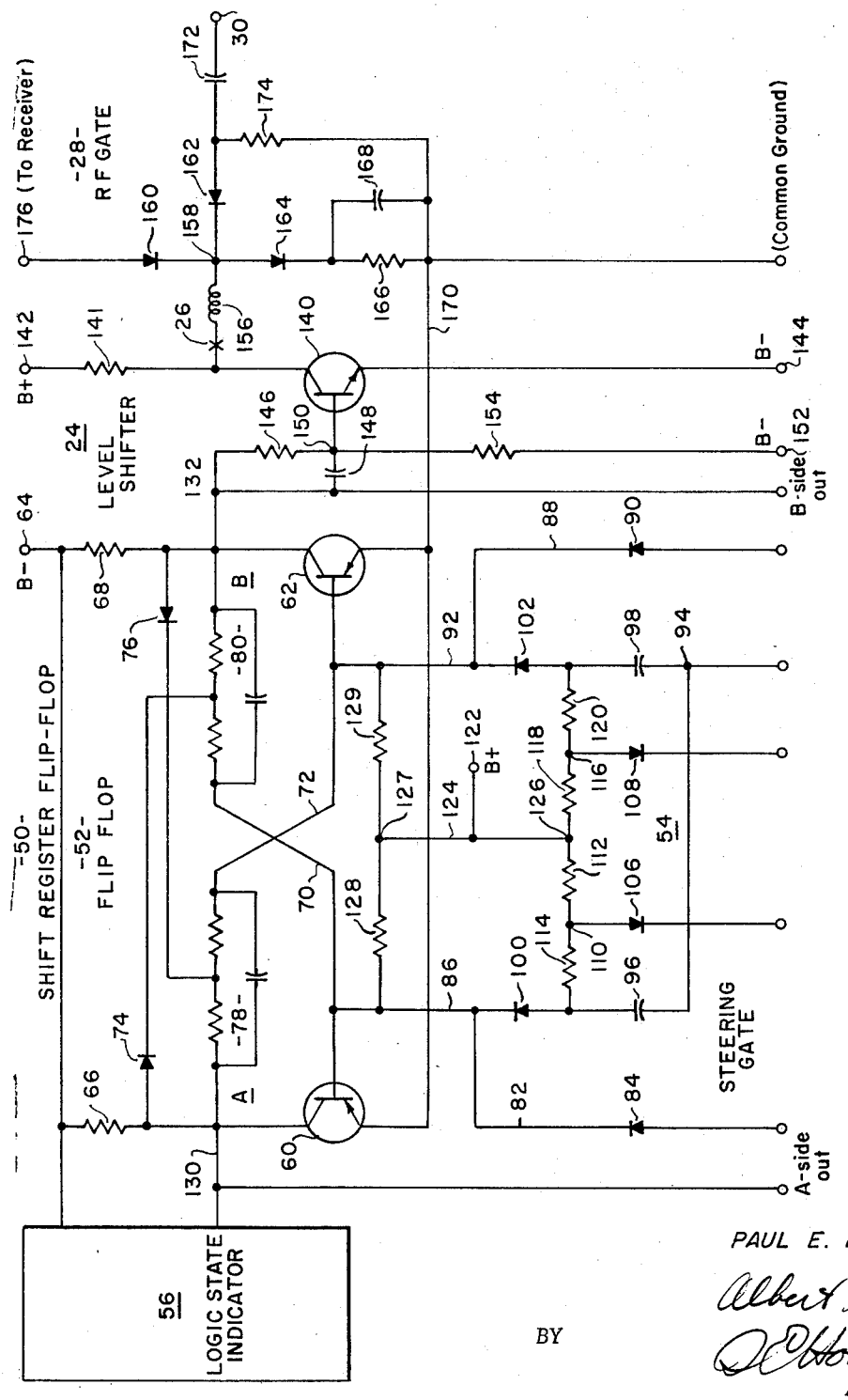

April 21, 1970  P. E. MARTIN  3,508,266
SOLID STATE COMMUTATOR

Filed June 24, 1968  3 Sheets-Sheet 3

INVENTOR
PAUL E. MARTIN

BY
ATTORNEYS

United States Patent Office 3,508,266
Patented Apr. 21, 1970

3,508,266
SOLID STATE COMMUTATOR
Paul E. Martin, San Antonio, Tex., assignor, by mesne assignments, to the United States of America as represented by the Secretary of the Navy
Filed June 24, 1968, Ser. No. 739,304
Int. Cl. H01q 3/24
U.S. Cl. 343—100     3 Claims

ABSTRACT OF THE DISCLOSURE

A programmable ring counter chain comprising a cascade of steerable bistable devices is selectively steered to provide sequential activation of output elements such as RF switches in selected ordered arrays whereby, for example, certain antennas or groups thereof of an antenna array may be activated at different positions in relation to beam azimuth to adjust direction finding response.

The invention described herein may be manufactured and used by or for the Government of the United States of America for governmental purposes without the payment of any royalties thereon or therefor.

BACKGROUND OF THE INVENTION

In wide aperture high frequency direction finding systems utilizing, for example, the Beverage Antenna, there is a need to provide sequential selection of groups of antennas spaced about the beam azimuth to enable improved detection and display of the bore sight direction to the target. It is difficult to accurately read on a Direction Finder PPI scope the exact direction of a target emanating a signal because of the bulbous shape of the detection pattern on the PPI scope. Spacing of antenna sampling about the target direction allows enhancement or nulling at target bearing, and thus more definite and accurate display.

SUMMARY OF THE INVENTION

The purpose of the present invention is to provide electronic commutating means for sequential sampling in a programmed manner of a group of devices such as a circular array of antenna elements. The amplitude of the sampled signal can be displayed in synchronism with a circular sweep applied to a cathode ray tube. Thus there is provided according to the invention a synthesized static field pattern of a selected number of antennas simultaneously sampled and linearly summed.

Briefly stated, the present invention affords a programmable commutating system comprising a plurality of steerable flip-flop stages forming a ring counter, one stage for each antenna covering, say 2° of bearing. Each of the plurality steerable flip-flops is preconditioned to a selected state. Responsive to trigger pulses, the ring counter is sequentially stepped, each trigger pulse enabling certain ones or selected arrays of the flip-flops. The outputs of the activated flip-flops are fed via appropriate level shifting circuitry to respective RF switches therefor to selectively connect antenna outputs to receivers for sampling and summing. The selectively sampled antenna outputs may be synchronized in the receiver by any suitable means to afford PPI display of the detected signal.

BRIEF DESCRIPTION OF THE DRAWINGS

FIG. 2 is a view in schematic diagram form of a module portion of FIG. 1 (outlined in broken lines)

DETAILED DESCRIPTION OF THE INVENTION

Figure 1:
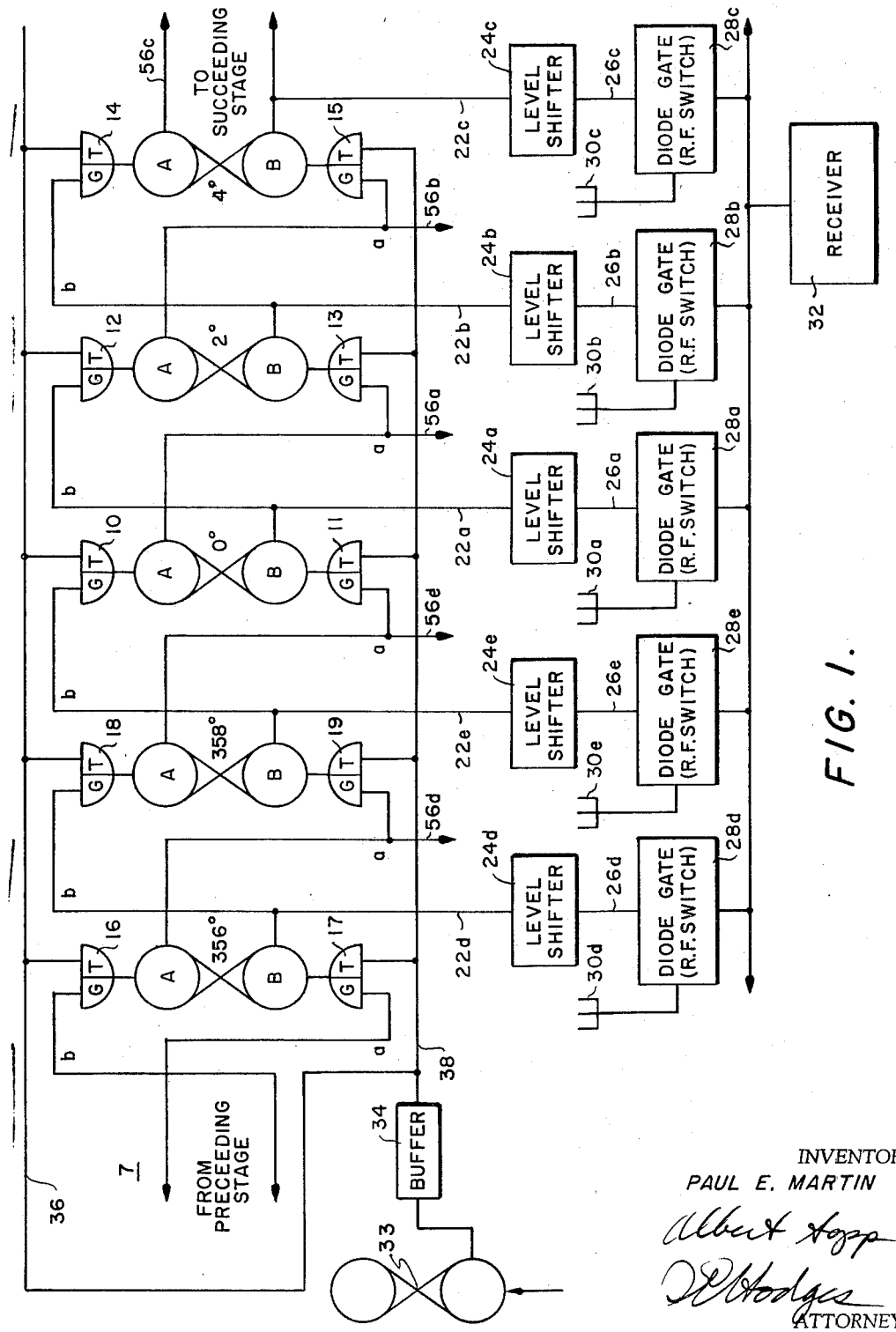
FIG. 1 is a view in block diagram form of a representative portion of the commutator according to the invention.

Referring to FIG. 1 there is shown a programmable ring counter having 180 steerable flip-flop stages each having states "A" and "B," said stages being labeled 0°, 2°, 4°, 356°, 358°. A steering portion of each of the flip-flop stages comprises a coincidence gating circuit connected to its flip-flop stage to selectively enable or prevent a change of state of the flip-flop. The coincidence circuit for the 0° flip-flop comprises coincidence gates 10 and 11 each having input gate portions G and T; gate 10 providing inputs for the A side of the flip-flop and gate 11 the B side. In a similar manner coincidence gates 12 and 13 provide inputs for sides A and B of the 2° flip-flop, respectively. The gates for flip-flop stage 358° are designated as 18 and 19.

The A and B sides of each of the flip-flops are connected respectively by leads "a" and "b" to the coincidence gates for the opposite B and A sides of the following flip-flop. Therefore, if stages 356° and 358° are both in the A-one, B-zero logic state and a trigger pulse is applied to both said stages, the 358° stage will "look back" to the 356° stage and remain in its same logic state. If the 356° stage is A-one, B-zero, and the 358° stage is A-zero, B-one, application of a trigger pulse will cause the 358° stage to shift to the A-one, B-zero state. Consequently, as will be explained in greater detail later, each stage of the ring counter may be programmed or set into a given state which may shift or not shift depending upon the state of the preceding stage and occurrence of a trigger pulse.

The outputs of the respective steerable flip-flop stages are connected via leads 22a, 22b, 22c, etc., to respective identical level shifting circuits 24a, 24b, 24c, 24d and 24e. Leads 26a, 26b, 26c, etc. connect the outputs of the respective level shifting circuits 24a, etc. to corresponding ones of identical RF gates 28a, 28b, etc. Each RF gate is selectively connected to one of respective antenna elements 30a, 30b, etc. and to a summing receiver 32 depending upon the characteristics of the signal in lead 26. Trigger pulses for the counter are provided from a one-shot multivibrator 33 fed via a buffer stage 34 and leads 36 and 38 to the "T" portion of each coincidence gate circuit. As will be further explained later, steering pulses are applied to the G portion of each coincidence gate and by virtue of their timing relation to trigger pulses, enable changes in state of the flip-flops from A to B or B to A.

One of the steerable ring counter stages of the invention is shown in schematic detail in FIG. 2 and comprises a shift register flip-flop 50 having a flip-flop portion 52 and a steering or shifting section or coincidence gate 54. An associated level shifter 24 and RF gate 28 are also shown in detail in FIG. 2 as indicated and represent one of identical units 24a, 24b, etc. and 28a, 28b, etc. A logic state indicator circuit 56 of any suitable design is shown electrically connected to one side of the flip-flop 52 and is employed locally or at a remote station to indicate the status of the flip-flop. Such a circuit is well known in the art and need not be shown in detail.

The steerable flip-flop 50 has first and second PNP transistors 60 (for state A) and 62 (for state B) connected to provide flip-flop or bistable operation. A source of negative potential 64 is connected through suitable respective dropping resistors 66 and 68 to the collector electrode of each transistor. The base of each transistor is connected by respective leads 70 and 72 to the collctor of the other transistor. Rectifiers 74 and 76 and respective RC circuits 78 and 80 provide suitable wave shaping for the respective base inputs.

Respective set and reset controls for programming the flip-flop are provided by a lead 82 and diode 84 connected via a lead 86 to the base of transistor 60 and a lead 88 and diode 90 connected via a lead 92 to the base of transistor 62.

The change in state of each flip-flop is enabled by means of coincidence of steering and trigger pulses appearing at inputs G and T of each gate 10, 11, 12, etc. The steering pulses applied to the flip-flop determine whether the flip-flop is to change state, and trigger pulses enable gating action to activate the change of state.

To effectuate the steering/gating action, positive-going trigger pulses are applied from the one-shot device 33 to a junction point 94 terminating leads 86 and 92 connected to the bases of respective transistors 60 and 62. Suitable coupling capacitors 96 and 98 are provided in respective leads 86 and 92 for coupling the trigger pulses into the circuit. Respective steering diodes 100 and 102 in leads 86 and 92 enable the positive clock pulses from junction 94 to reach the transistor base electrodes. However, appearance of a trigger pulse on either one of the conductive paths 86 and 92 is insufficient by itself to initiate change of state of that transistor. Sufficient pulse energy on the leads 86 and 92 is achieved by means of a coincidence gate 54 to sufficiently forward bias the diodes 100 and 102 to enable passage of pulse energy therethrough. The coincidence gate 54 has first and second input diodes 106 and 108 each poled to pass negative input pulses. The positive side of diode 106 is connected to a junction point 110 dividing a relatively high resistance 112 and relatively low resistance 114. Similarly, the positive side of diode 108 is connected to a junction point 116 dividing a relatively high resistance 118 and a relatively low resistance 120. A source of voltage 122 is fed via a lead 124 to a junction 126 dividing the resistances 112 and 118 and to a junction 127 separating a pair of equal resistances 128 and 129 connected respectively to leads 86 and 92.

The diodes 100 and 106 represent the G portion in FIG. 1 for each gate 10, 12, 14, 16 and 18, and the diodes 102 and 108 represent the G portion for each gate 11, 13, 15, 17 and 19.

Appearance of a negative pulse on the input side of either one of diodes 106, 108 provides forward biasing through either but not both of resistances 114, 120 for gating one of respective diodes 100, 102, so that a trigger pulse applied to junction 94 will pass through either one, but not both, of said diodes 100, 102. If at a given instant A side transistor 60 is conducting and there is applied simultaneously a trigger pulse at junction 94 and a negative steering pulse at diode 106, then diode 100 will be forward biased to enable the positive going voltage of the trigger to reach the base of transistor 60. The positive trigger pulse reverse biases transistor 60 causing it to cut off. The resulting rise in the negative collector voltage of transistor 60 reaches the base of B side transistor 62 via lead 72 and causes transistor 62 to conduct the flip-flop, thus changing state from A to B. Of course, appearance of positive voltage at the base of a non-conducting PNP transistor 60 or 62 will have no effect on the flip-flop, and no change of state thereof will occur.

The two flip-flop outputs, one for each side A and B, appear on leads 130 and 132, respectively. The A side output on lead 130 is fed to the lamp indicating circuits 56a, b, etc. The B side output on lead 132 of each flip-flop is fed to a respective one of the level shifting circuits 24a, b, c, etc. (FIG. 1) one of which is shown in detail in FIG. 2. The level shifters 24a, etc. provide negative and positive voltage to the RF gate depending on the output appearing on lead 132.

More specifically, the level shifter 24 employs an NPN transistor 140 having its collector electrode connected via a resistor 141 to a source of positive potential, 142; its emitter coupled to a source of negative potential, 144; and its base connected to lead 132 via a resistance 146 and shunt capacitor 148 and a junction point 150. Junction point 150 is also connected to a source of negative potential, 152, via a dropping resistor 154 and to lead 132 through resistor 146. The output of the transistor is couplel via the lead 26 to the RF gate 28.

When transistor 62 of the flip-flop is driven to conduction, the base of transistor 140 approaches ground potential and the transistor conducts. The output of NPN transistor appears on the lead 26 in the form of a negative going voltage approaching that of negative potential on emitter 144. When the transistor 140 is not conducting due to non-conduction of the transistor 62, positive bias voltage as dropped by resistor 141 appears on output lead 26.

The RF gate 28 is coupled to the level shifter via an inductor 156 and junction point 158 and includes series diodes 160 and 162 connected at their negative poles to the junction point 158. A shunt diode 164 has its positive side connected to junction point 158 and its negative side through a parallel RC circuit with resistor 166 and capacitor 168 to a common ground lead 170. The antenna 30 is coupled via a capacitor 172 to the positive side of diode 162 and via a resistor 174 to ground lead 170. The antenna output to be sampled or summed is fed via a lead 176 from diode 160 to the receiver as indicated.

When the level shifting transistor 140 is conducting, the voltage on lead 26 goes negative thus forward biasing the series diodes 160 and 162 and back biasing diode 164, thereby coupling the antenna output via capacitor 172 to the recevier 32 via punction 158 and lead 176. When transistor 140 is non-conducting (because B side transistor 62 is non-conducting or in its zero logic state of the flip-flop), the shunt diode 164 conducts, developing a bias across resistor 166 which applies a reverse bias to the series diodes 160, 162 effectively isolating the antenna from the receiver.

With the description and operation of the specific circuitry of the identical sterrable flip-flops, level shifters and RF gates in mind, the operation of the programmable ring counter of FIG. 1 may be better understood.

The logic state of a given flip-flop stage for a given trigger pulse from source 32 is determined by the logic state of the flip-flop stage preceding it in the ring and at the application of a trigger pulse. The stage under observation will go to, or remain in, the same state as the stage preceding. For example, assume that in an initial condition the B sides of flip-flop stages 358° and 0° in the "one" state (their A sides therefore being in the "zero" state), and that the B sides of the 356°, 2° and 4° stages are in the "zero" state prior to application of a trigger pulse.

Also prior to the application of a trigger pulse, the 358° stage "sees" the 356° stage in the A-"one," B-"zero" logic state. Transistor 60 of the 356° stage provides an output at its A side via the lead "a" to the G side of steering gate 19 of the 358° stage. When a trigger pulse appears at the T portion of the gate 19, transistor 62 representing the B side of the 358° stage receives a positive going voltage at its base and commences turning off. The A side of the 358° stage thus turns on, so that the 358° stage is in an A-"one," B-"zero" state.

However, the 0° flip-flop stage saw A at logic "zero" and B at logic "one" in the 358° stage as the trigger pulse was applied on leads 36 and 38. (The 0° stage was initially set so that its A side was in logic zero and its B side in logic one before application of the trigger pulse). Therefore, the 0° stage saw the 358° stage in the same state as the 0° stage and remains in the A-zero, B-one logic state. More specifically, the A side of the 358° stage fed a logic zero to the portion G of gate 11 so that a trigger pulse was not enabled through that gate to the base of the B side transistor 62 of flip-flop stage 0°. Therefore, the B side could not begin to turn off, but remained in its previous state. Meanwhile, since application of a logic one output from the B side of the 358° stage to the G portion of gate 10 the trigger pulse to the T portion of gate 10 had no effect on the A side transistor 60 thereof which was non-conducting, or in its "zero" state.

The 2° flip-flop stage, in the A-"one," B-"zero" logic state before application of the trigger pulse, receives at portion G of its steering gate 12 a logic "one" via the lead "b" from the B side of the 0° flip-flop stage simultaneously with a trigger pulse at portion T of gate 12. Therefore, gate 12 passes a positive going voltage to the base of the A side transistor 60 of the 2° flip-flop stage causing it to turn off and the B side transistor 62, to turn on. Therefore, the 2° flip-flop stage changes its state to that which it "saw" in the preceding 0° stage—an A zero, B-one logic state.

Finally, the 4° stage, set in the A-"one," B-"zero" logic state saw 2° stage in the A-"one," B-"zero" state. Thus, portion G of gate 15 was enabled to pass a concurrent trigger pulse reaching portion T to B side transistor 62 of the 4° state. But since said transistor was non-conducting, the B side of the 4° stage is unaffected, and the 4° stage does not change state.

The following Table I summarizes and extrapolates the above-described, illustrative operation:

TABLE I

| Stage | Initial State | | First Trigger | | Second Trigger | | Third Trigger | |
|---|---|---|---|---|---|---|---|---|
| | A | B | A | B | A | B | A | B |
| 356° | 1 | 0 | 1 | 0 | 1 | 0 | 1 | 0 |
| 358° | 0 | 1 | 1 | 0 | 1 | 0 | 1 | 0 |
| 0° | 0 | 1 | 0 | 1 | 1 | 0 | 1 | 0 |
| 2° | 1 | 0 | 0 | 1 | 0 | 1 | 1 | 0 |
| 4° | 1 | 0 | 1 | 0 | 0 | 1 | 0 | 1 |
| 6° | 1 | 0 | 1 | 0 | 1 | 0 | 0 | 1 |
| 8° etc. | 1 | 0 | 1 | 0 | 1 | 0 | 1 | 0 |

Figure 3A:
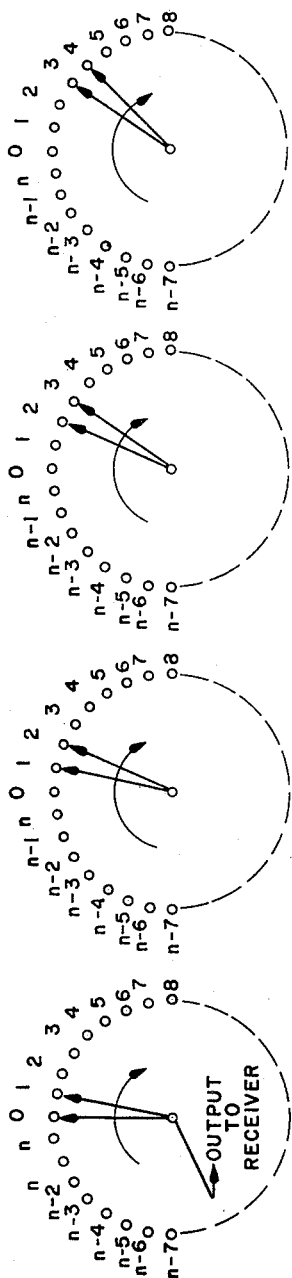
FIGS. 3a and 3b are explanatory diagrams of the working of the invention by mechanical analogy.
Like numerals represent like parts throughout the drawings.

It is observed that 6° and 8°, etc., stages are eventually stepped by subsequent trigger pulses, so that as indicated by the underlined flip-flop logic states in the Table I above, the entire 360° antenna array is sampled in steps of adjacent pairs of antenna elements as shown in the mechanical analogy of FIG. 3a. Whenever a flip-flop stage is in the B logic state "one," the antenna associated therewith is gated to pass signal information to the receiver 32. Thus, in the above example and table, before the first trigger pulse antenna elements 30e and 30a feed signals to the receiver 32; at the first trigger, antennas 30a and 30b are enabled, and so on through 360° azimuth with succeeding trigger pulses.

Figure 3B:
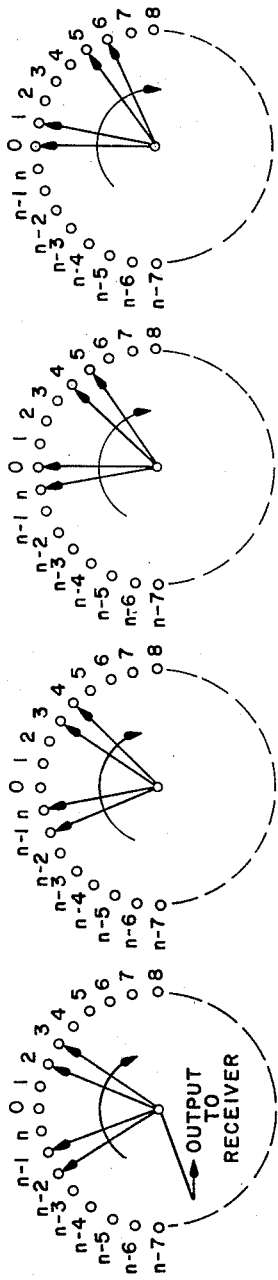

According to the invention, antenna elements may be stepped through azimuth in any selected grouping, another example of which is given below and mechanically analgized in FIG. 3b, to provide split beam scanning with two-on, three-off, two-on sampling of adjacent antenna elements:

TABLE II

| Stage | Initial | | Trigger #1 | | Trigger #2 | | Trigger #3 | |
|---|---|---|---|---|---|---|---|---|
| | A | B | A | B | A | B | A | B |
| 356° | 1 | 0 | 1 | 0 | 1 | 0 | 1 | 0 |
| 358° | 0 | 1 | 1 | 0 | 1 | 0 | 1 | 0 |
| 0° | 0 | 1 | 0 | 1 | 1 | 0 | 1 | 0 |
| 2° | 1 | 0 | 0 | 1 | 0 | 1 | 1 | 0 |
| 4° | 1 | 0 | 1 | 0 | 0 | 1 | 0 | 1 |
| 6° | 1 | 0 | 1 | 0 | 1 | 0 | 1 | 1 |
| 8° | 0 | 1 | 1 | 0 | 1 | 0 | 1 | 0 |
| 10° | 0 | 1 | 0 | 1 | 1 | 0 | 1 | 0 |
| 12° | 1 | 0 | 0 | 1 | 0 | 1 | 1 | 0 |
| 14° | 1 | 0 | 1 | 0 | 0 | 1 | 0 | 1 |
| 16° | 1 | 0 | 1 | 0 | 1 | 0 | 0 | 1 |

In the above Table II the detection of the exact bearing of a signal is facilitated by splitting the beam about the central axis of the antenna grouping. The operation of the steerable ring counter to produce the above result follows that of the previously described operation for stepping of antenna elements in pairs, it being understood that in the Table II illustration the flip-flop stages are programmed or set initially to provide two adjacent flip-flops in the B-"one" state, then the next three flip-flops in the B-"zero" state and the next two, in the B-"one" state.

Obviously many modifications and variations of the present invention are possible in the light of the above teachings. It is therefore to be understood that the invention may be practiced otherwise than as specifically described.

What is claimed is:

1. A switching system for cylically feeding information from a selected plurality of antenna elements to a receiver comprising:
   a source of trigger pulses;
   a presettable ring counter having a plurality of successively connected bi-stable devices each associated with at least one of said antenna elements, each of said devices having A and B sides in one of two opposing dependent logic states "one" and "zero";
   gating means connected to the antenna elements and to the B side of each of said bi-stable devices for coupling an antenna element to the receiver whenever the B side of a bi-stable device is in logic "one"; and
   steering gate means connected to each preceding and successive bi-stable device and to said source of trigger pulses for controlling the logic state of the succeeding bi-stable device dependent upon the initial preset state, the state of the preceding bi-stable device, and the occurrence of a trigger pulse,
   whereby said antenna elements may be sampled in a predetermined grouping cyclically to said receiver.

2. Apparatus according to claim 1 wherein said gating means comprises a level shifting circuit connected to the B side of each of said bi-stable devices; and
   an individual switching circuit connected to each of said level shifting circuits for enabling, in response to one output level in the level shifting circuit, passage of antenna signals to the receiver, and for disabling in response to another output level in the level shifting circuit passage of antenna signals to the receiver.

3. Apparatus according to claim 2 wherein said RF switching circuit comprises a first path having therein non-linear conductive means forward biased by said one output level of said level shifting circuit and second path having therein non-linear conductive means reversed biased by said other output level of the level shifting circuit.

References Cited
UNITED STATES PATENTS

| | | | |
|---|---|---|---|
| 3,047,864 | 7/1962 | Byatt | 343—113 |
| 3,213,458 | 10/1965 | Hansel et al. | 343—876 |
| 3,311,870 | 3/1967 | Grohe et al. | 343—113 X |

RODNEY D. BENNETT, JR., Primary Examiner

R. E. BERGER, Assistant Examiner

U.S. Cl. X.R.

307—223; 343—113